Patented Aug. 15, 1939

2,169,379

UNITED STATES PATENT OFFICE 2,169,379

ELEMENTAL SULPHUR FROM HYDROCARBON GASES CONTAINING HYDROGEN SULPHIDE

Hans Barkholt, Berlin-Halensee, Germany, assignor to Zahn & Co., G. m. b. H., Berlin, Germany No Drawing. Application December 31, 1935, Serial No. 57,005

4 Claims. (Cl. 23—225)

This invention relates to processes of producing elemental sulphur from hydrocarbon gases containing hydrogen sulphide, which gases are produced or utilized either in the cracking of mineral oils or asphalt to produce gasoline, fuel oil, and the like, or in synthetic processes of preparing motor fuels, and other products.

According to prior processes for treating these gases, the hydrogen sulphide therein has usually been separated or concentrated by adsorption, absorption or solution in a liquid or in a porous solid, for example, phenolates, amines, propionates, acetates, phosphates, silica gel, activated carbon, and others, after which the liquid or solid is heated to cause the hydrogen sulphide to be evaporated off together with varying amounts of hydrocarbons or other organic compounds. This contaminated hydrogen sulphide is then usually completely burned to produce sulphur dioxide gas, which gas in its hot state as produced is then immediately utilized for the production of sulphuric acid suitable for use in conventional or other chemical refining operations for the treatment of lubricating or other oils. In this process the reaction proceeds in acordance with the equation:

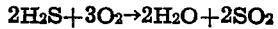

Although this prior method of recovering the sulphur content of hydrocarbon gases has proved to be of some value, the method of utilization of the product is practically limited to the production of sulphuric acid. An object of the present invention is to recover the sulphur content of such gases in the form of elemental sulphur such that it may either be sold as such as an article of commerce or be converted into any of the many compounds of sulphur derivable from sulphur in its free state. As far as is known, no one up to the present time has been commercially successful in separating sulphur as such from gases containing a proportion of hydrocarbons by a simple oxidation process.

In accordance with one embodiment of the invention, the sulphuretted hydrogen gases from the above mentioned sources contaminated by the presence of hydrocarbons are mixed with a quantity of oxygen under conditions adapted to oxidize only the hydrogen content of the hydrogen sulphide and to burn completely the hydrocarbons thereby to produce elemental sulphur. The reaction proceeds in accordance with the known reaction:

The above reaction is effected by introducing a stream of the hydrogen sulphide-hydrocarbon gases together with a predetermined quantity of oxygen or oxygen-containing gas into a heating zone maintained at a temperature of from about 300° to 500° C. in the presence of an oxidation catalyst adapted to cause such oxidation to occur. In the preferred practice the temperature in the heating zone should be maintained above 400° C. for best results. The heating zone may be a brick wall kiln having one or more inlets near its top for the introduction of the hydrogen sulphide-hydrocarbon gases and oxygen, having a bed of porous catalytic material through which the gases pass, and outlets preferably at its bottom extremity for the expulsion of the sulphur and the other products of the reaction including any unaltered gases. Since most of the sulphur agglomerates in the hot catalytic mass, it flows to the bottom of the zone in molten form. Its removal from the heating zone may be accomplished by providing a slanting bottom leading to a discharge conduit through which the liquid sulphur will flow to suitable conveyors or molds.

Since some of the free sulphur produced by the reaction remains in powder form, the exit gases carry the same out of the heating zone. This sulphur powder or flowers of sulphur is removed and collected by conducting the exit gases through chambers containing a series of baffle walls and/or scrubbers.

In operation of the process, care must be taken to proportion properly the quantity of oxygen introduced into the heating zone, for an excess will lead to oxidation of the sulphur to sulphur dioxide, and an insufficient supply, to the loss of hydrogen sulphide. Incomplete combustion of the hydrocarbons, which may be due to lack of oxygen or the application of an insufficient temperature, forms carbon black which poisons the catalyst. Any appreciable amount of either of these gases in the exit gases indicates improper proportions of oxygen to the hydrogen sulphide in the gases being used, or that the temperature is improperly regulated. However, any hydrogen sulphide or sulphur dioxide remaining in the gases, unavoidably or otherwise, may be utilized in the production of sulphuric acid, the hydrogen sulphide being burned, of course, to produce sulphur dioxide to be used in the ordinary contact or chamber processes. The water formed by the reaction of the oxygen with the hydrogen of the hydrogen sulphide leaves a heating zone or furnace in vapor form and may be partly condensed in the baffle wall chambers and partly carried through such chambers to the stack or to a place of utilization.

As an example of the first embodiment of the invention described herein the hydrocarbon gas obtained from a cracking operation and containing a small percentage of hydrogen sulphide is concentrated by any of the methods hereindescribed to produce a hydrogen sulphide gas containing only a small percentage of hydrocarbons, that is, about 10% and less. The resulting hydrogen sulphide-hydrocarbon gas mixture is then mixed with the proper proportion of oxygen and oxidized and burned in the heating zone of the nature herein described containing a porous bed of any one of the catalysts, below mentioned. By maintaining the temperature of the reaction at about 400° C. or more, the hydrocarbons are completely burned to the carbon dioxide stage, thereby preventing deposition of carbon and contamination of the catalyst. This temperature may be varied somewhat depending upon the nature of the catalyst and the nature of the contaminating hydrocarbons.

Any of the conventional oxidation catalysts may be used, including bauxite, bog iron ore, activated carbon, titanic iron ore or titanium ore or salt.

In a second embodiment of the invention, the production of elemental sulphur is accomplished in two steps rather than one, by which procedure certain economies of operation are obtained. Here the hydrogen sulphide gases containing hydrocarbons are divided into two streams, one of which is led into a combustion chamber together with sufficient oxygen to oxidize the hydrogen sulphide content completely to sulphur dioxide. The resulting gases are then mixed with the other stream of hydrocarbon gases under the conditions hereinbefore described whereby the sulphur dioxide of the first stream is reduced by the hydrogen sulphide of the second stream in accordance with the following equation:

$$SO_2 + 2H_2S \rightarrow 3S + 2H_2O$$

In dividing the hydrogen sulphide-hydrocarbon gases into the two streams, the quantity in each stream preferably should be that necessary to provide stoichiometric proportions of sulphur dioxide and hydrogen sulphide in the two streams, respectively. The reaction may be carried out at the temperature normally resulting from the heat of the two streams of gases, but in all events must be sufficiently high to prevent poisoning of the catalyst. The elemental sulphur separates out and may be collected in molten form or in a dry form, or in both forms, depending upon the temperatures existing in the reaction chamber.

In this second embodiment of the invention, an economic advantage is had in the step which permits utilization of the heat of reaction of that portion of the hydrogen sulphide-hydrocarbon gases which is burned or completely oxidized to the sulphur dioxide stage. This heat may be employed for any purpose where indirect heating equipment is used, as for the production of steam. This invention contemplates also the conversion of hydrogen sulphide gases containing hydrocarbons, to elemental sulphur by $SO_2$ of any source whatsoever.

The reactions herein described and illustrated have been known for many years, but up to the time of the present invention no one has discovered that such reactions can be carried out or are not inhibited when the hydrogen sulphide is in admixture with hydrocarbon gas obtained from or utilized in the cracking and other processes hereinbefore described. The process is applicable not only to the gases hereinbefore described but also to natural gas containing hydrocarbons and $H_2S$.

The novel processes herein described are very efficient for they may be carried out at a very low cost both as to operating conditions and materials, and as to attendants.

It should be understood that the invention is not limited to the specific details herein set out but that it extends to all equivalent materials as well as conditions coming within the scope of the appended claims.

I claim:

1. In a process for producing elemental sulphur from hydrocarbon gases containing hydrogen sulphid, such as those obtained in the refining of mineral oil, the steps which comprise concentrating the hydrogen sulphide in said gases by removing a portion of the hydrocarbons, mixing the resulting gases with oxygen in a quantity suited to react with the hydrogen sulphide present to produce free sulphur and to effect complete combustion of the hydrocarbons, passing the mixed gases through a zone containing an oxidation catalyst that catalyzes the oxidation of hydrogen sulphide to free sulphur, and maintaining said gases while in said zone at temperatures between 400° and 500° C. at which free sulphur is formed and the depositing of free carbon on the catalyst is avoided.

2. The process of producing elemental sulphur from hydrogen sulphide gases containing hydrocarbons which comprises, burning a portion of such hydrocarbon-containing gases to produce sulphur dioxide, mixing the resulting combustion gases with another portion of such hydrocarbon-containing gases in proportions to produce two parts of hydrogen sulphide to one part of sulphur dioxide, reacting the hydrogen sulphide with the sulphur dioxide and oxidizing the hydrocarbons to form free sulphur, carbon dioxide and water by heating the mixture to 400° to 500° C. in the presence of sufficient oxygen to oxidize the hydrocarbons and passing the same through a porous bed containing an oxidation catalyst that catalyzes the oxidation of hydrogen sulphide to free sulphur, maintaining the mixture while passing through said bed at temperatures above 400° C. at which sulphur remains free and the hydrocarbons in the mixture are completely oxidized, and collecting the free sulphur.

3. The process comprising burning a mixture of hydrogen sulphide with hydrocarbon gases in the presence of an oxidation catalyst that catalyzes the oxidation of hydrogen sulphide to free sulphur and of sufficient oxygen to oxidize the hydrocarbons completely and to oxidize the hydrogen sulphide as to its hydrogen content only, thereby forming free sulphur, and maintaining the temperature at a point at which said oxidation of hydrogen sulphide to free sulphur and combustion of the hydrocarbons to carbon dioxide occur and above that at which the formation of free carbon and poisoning of the catalyst result.

4. The process of producing elemental sulphur from hydrogen sulphide gases containing hydrocarbons which comprises passing such hydrocarbon-containing gases together with a quantity of oxidizing gas sufficient to oxidize the hydrocarbons and the hydrogen sulphide present to yield free sulphur, carbon dioxide and water through a heated zone containing an oxidation catalyst that catalyzes the oxidation of hydrogen sulphide to free sulphur, maintaining said zone substantially throughout at temperatures in excess of 400° C. at which sulphur remains free, oxidizing hydrogen sulphide to sulphur and water vapor and oxidizing hydrocarbons in said zone without producing free carbon, and collecting the sulphur thereby formed.

HANS BARKHOLT.